Figure 21:
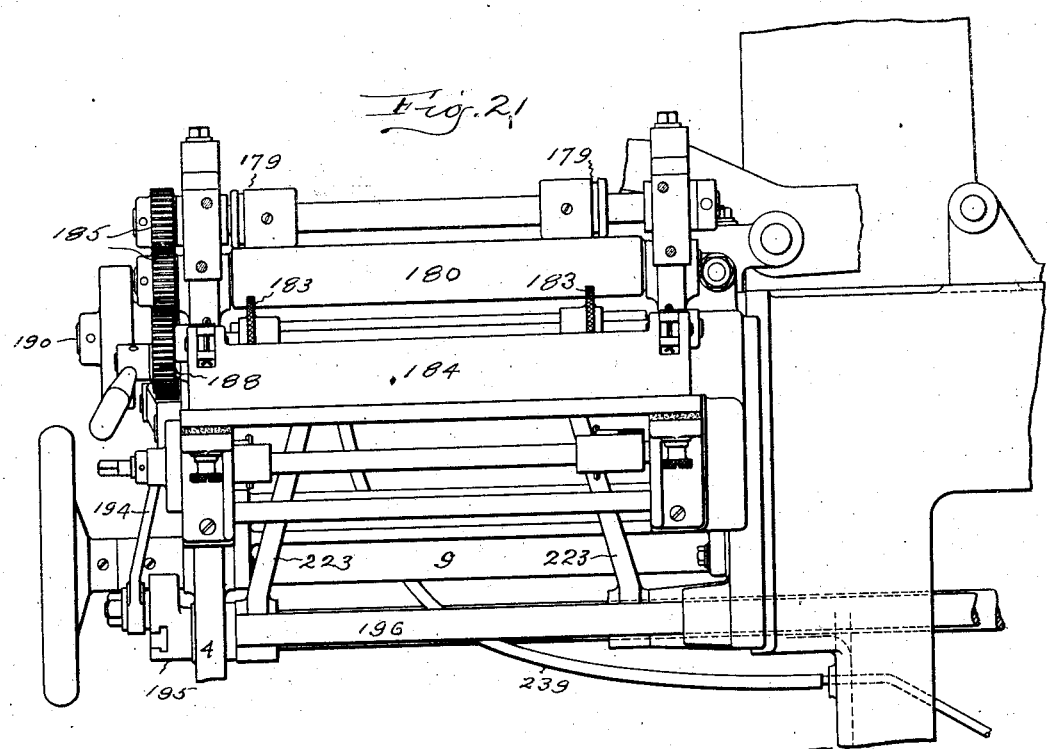

Jan. 12, 1926.  1,569,265
E. W. CLARK ET AL
BOOKBINDING MACHINE
Filed Dec. 9, 1924   13 Sheets-Sheet 1
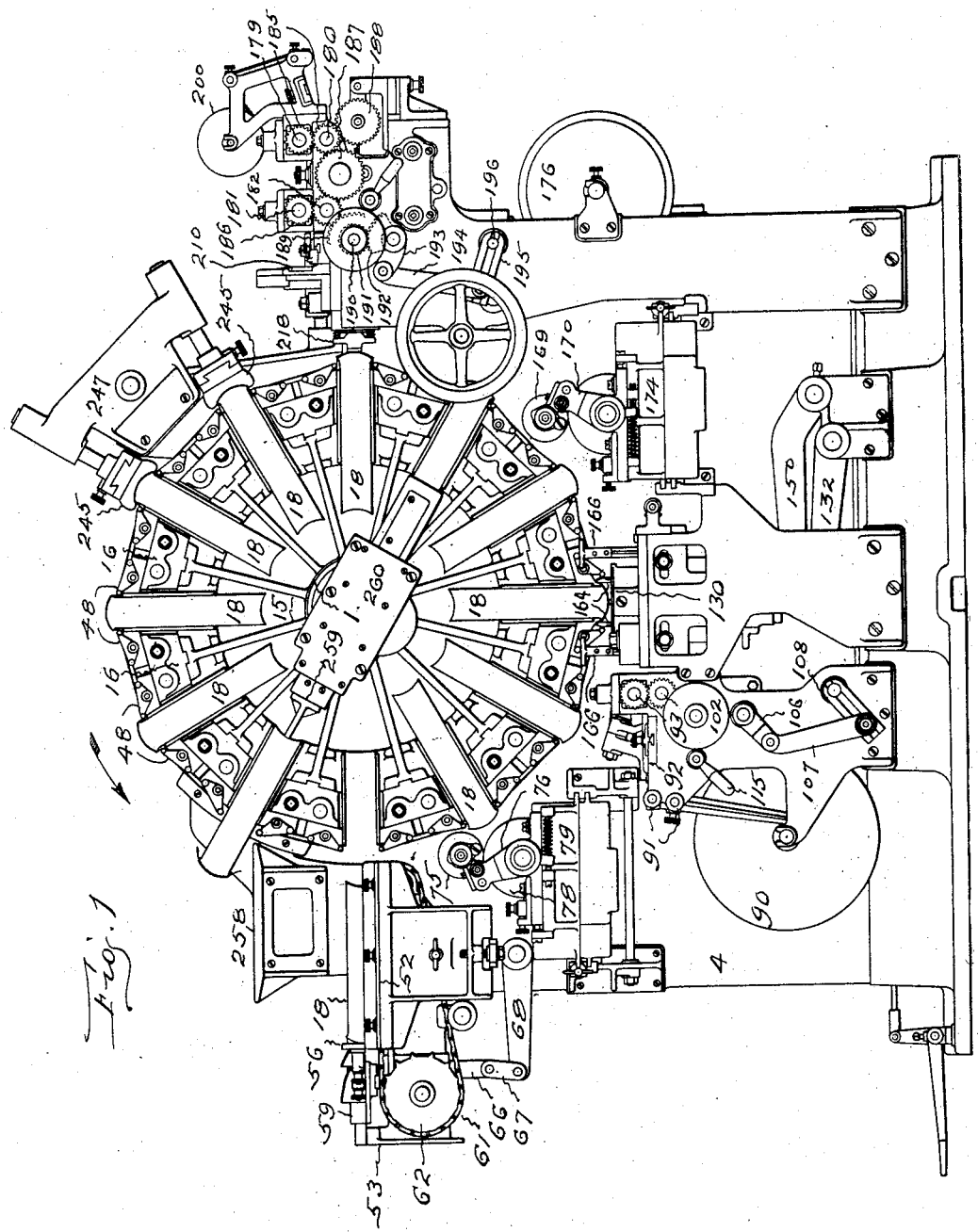
INVENTORS
Ernest W. Clark &
Carl Schramm by
Harry R. Williams
att.

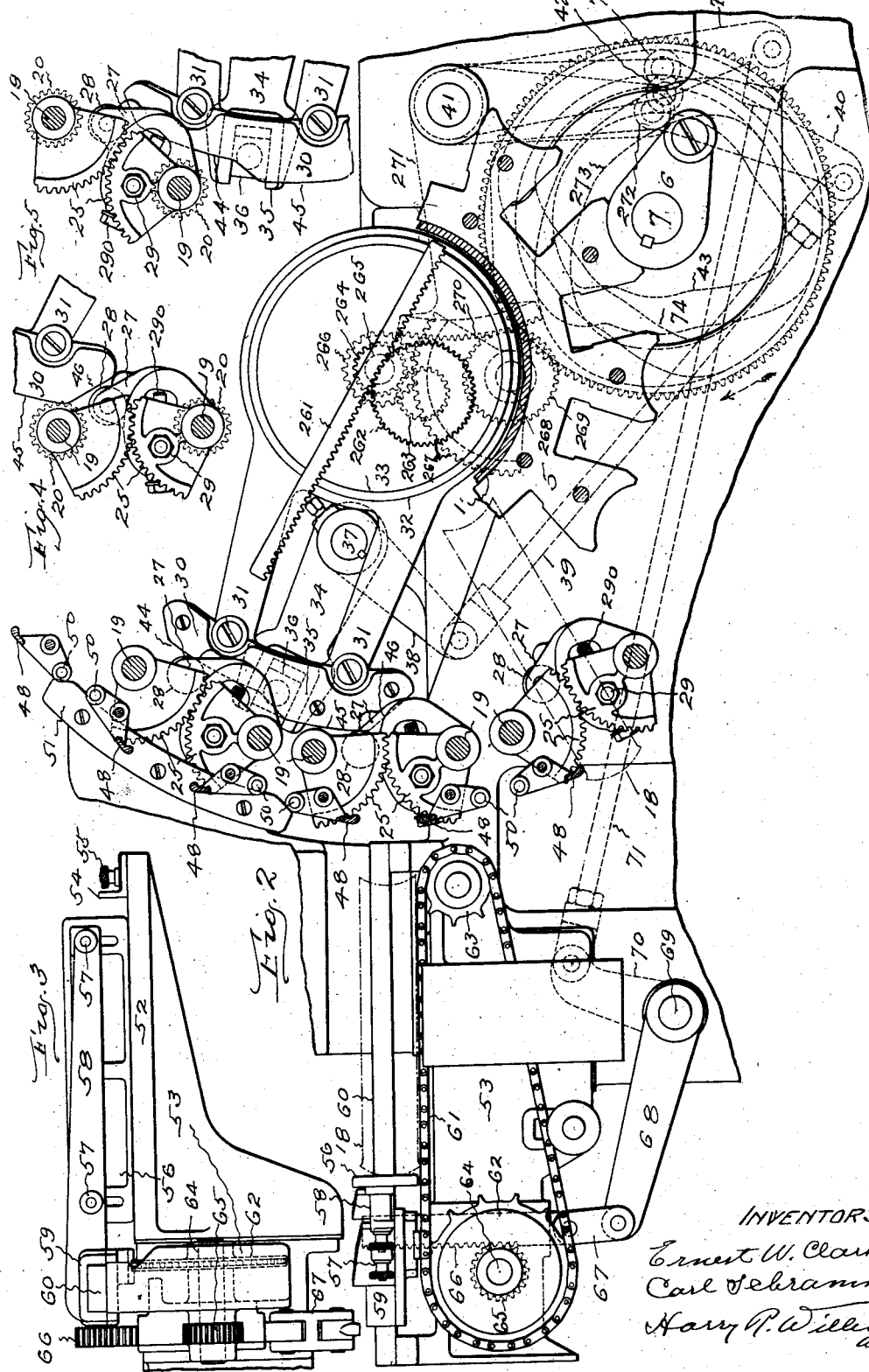

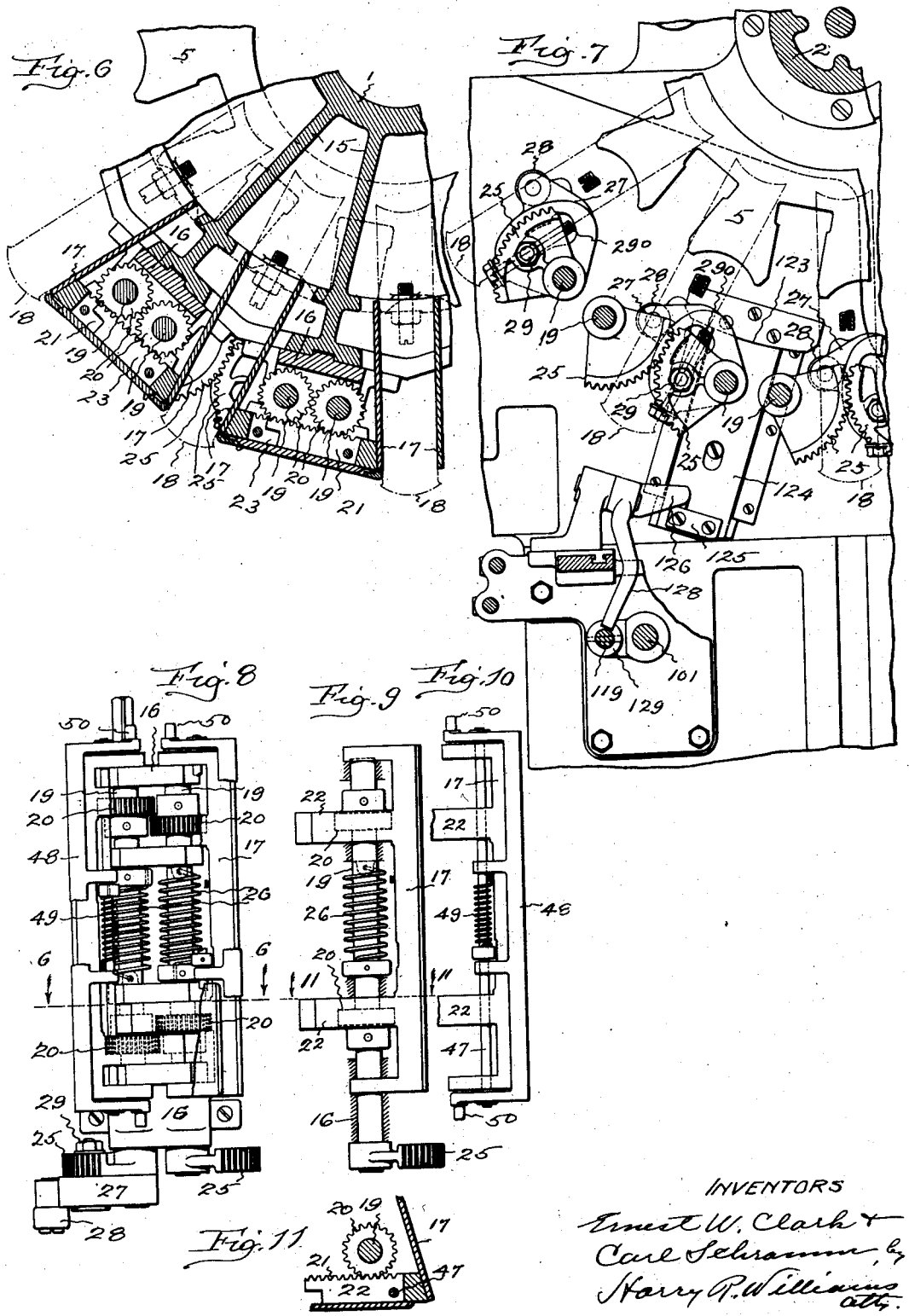

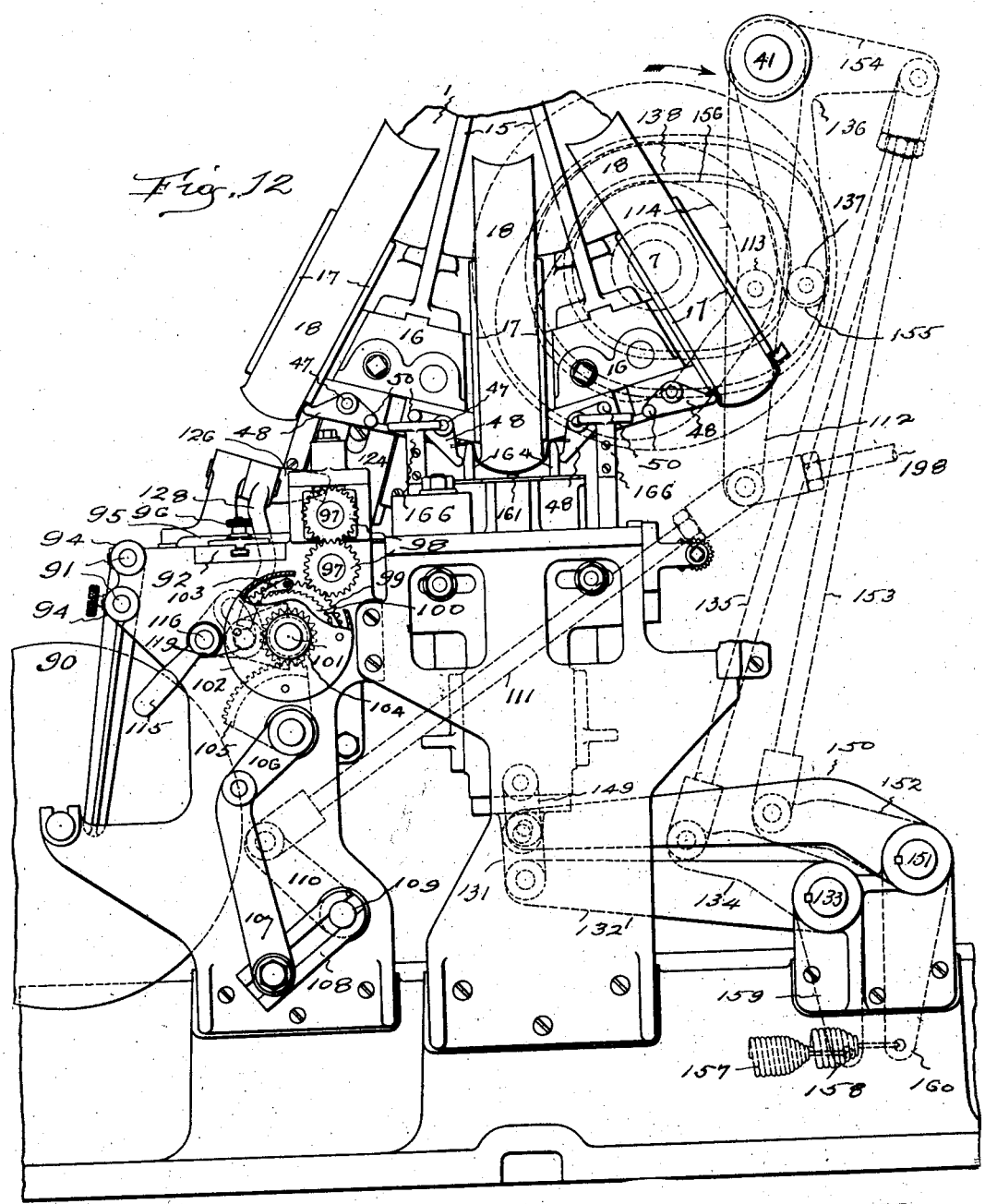

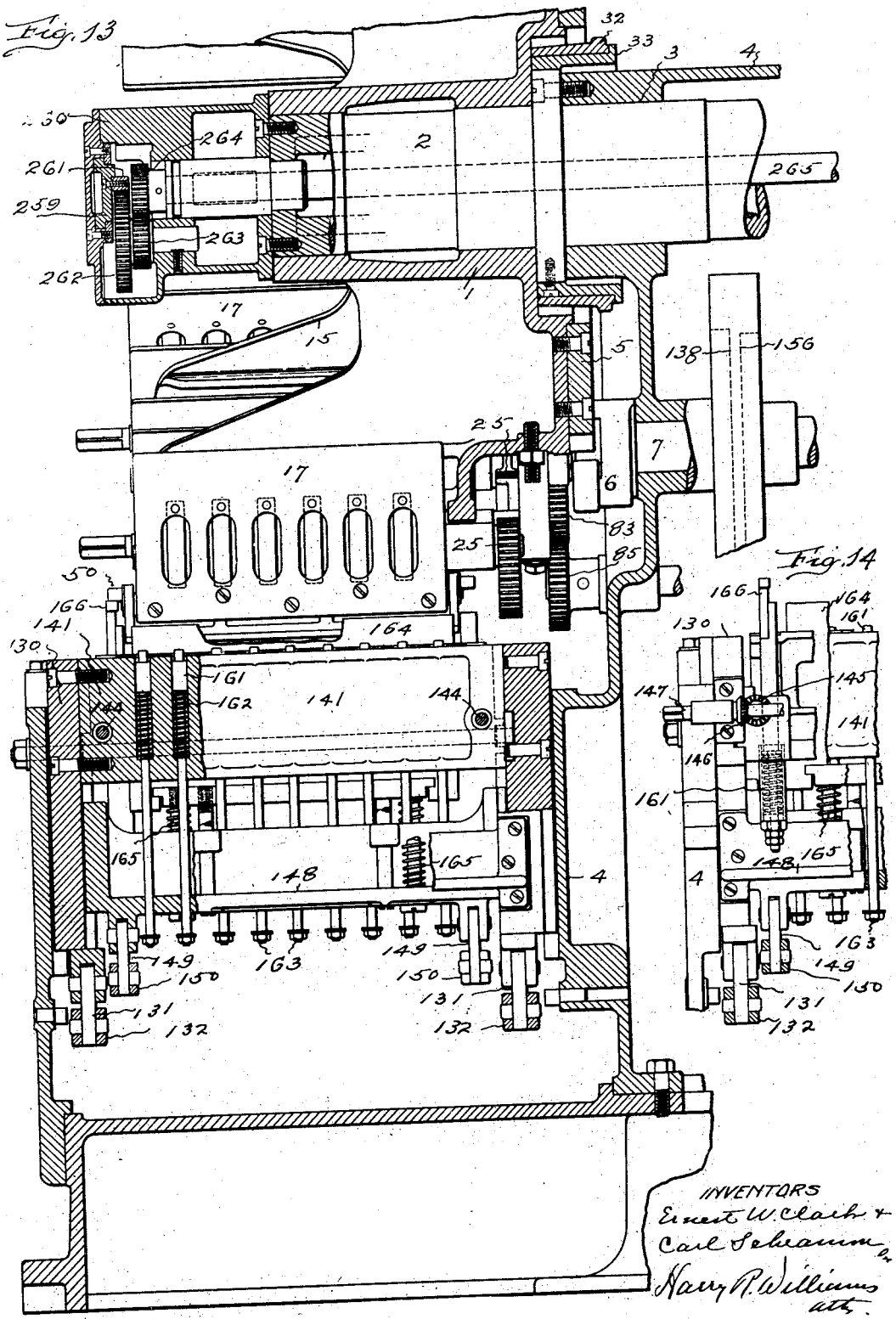

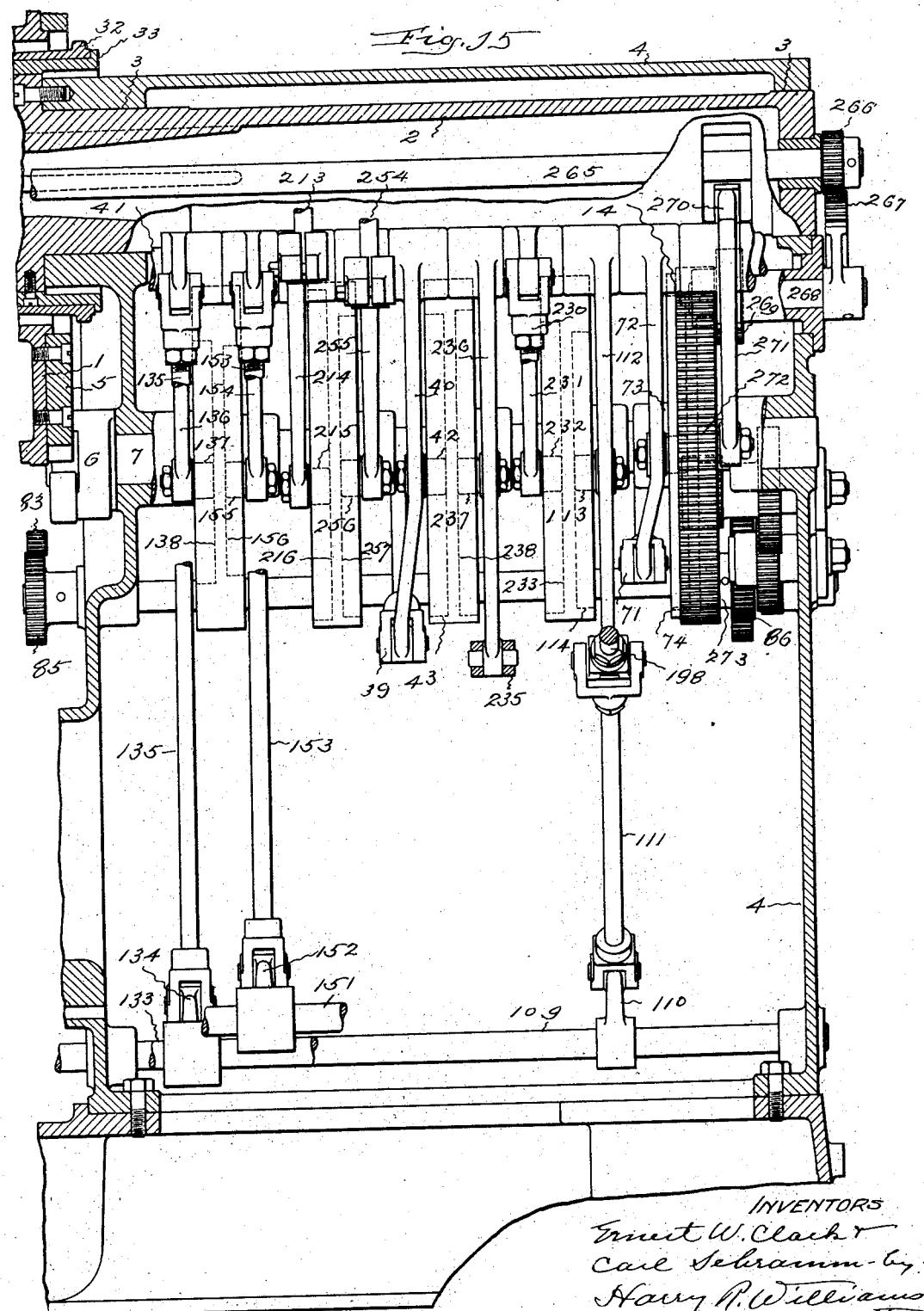

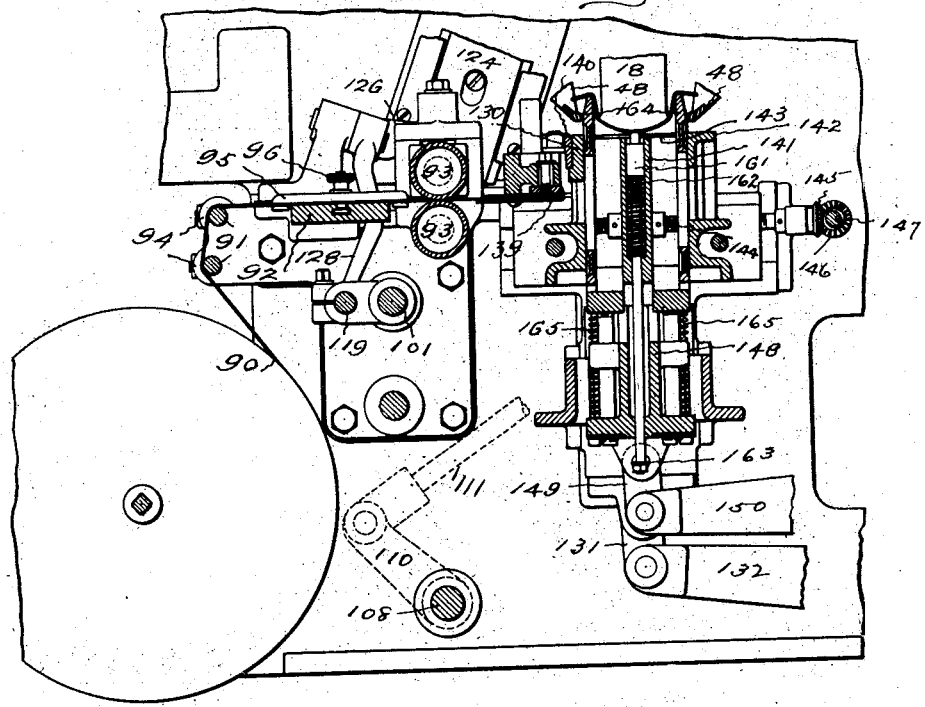

Jan. 12, 1926. 1,569,265
E. W CLARK ET AL
BOOKBINDING MACHINE
Filed Dec 9, 1924 13 Sheets-Sheet 8
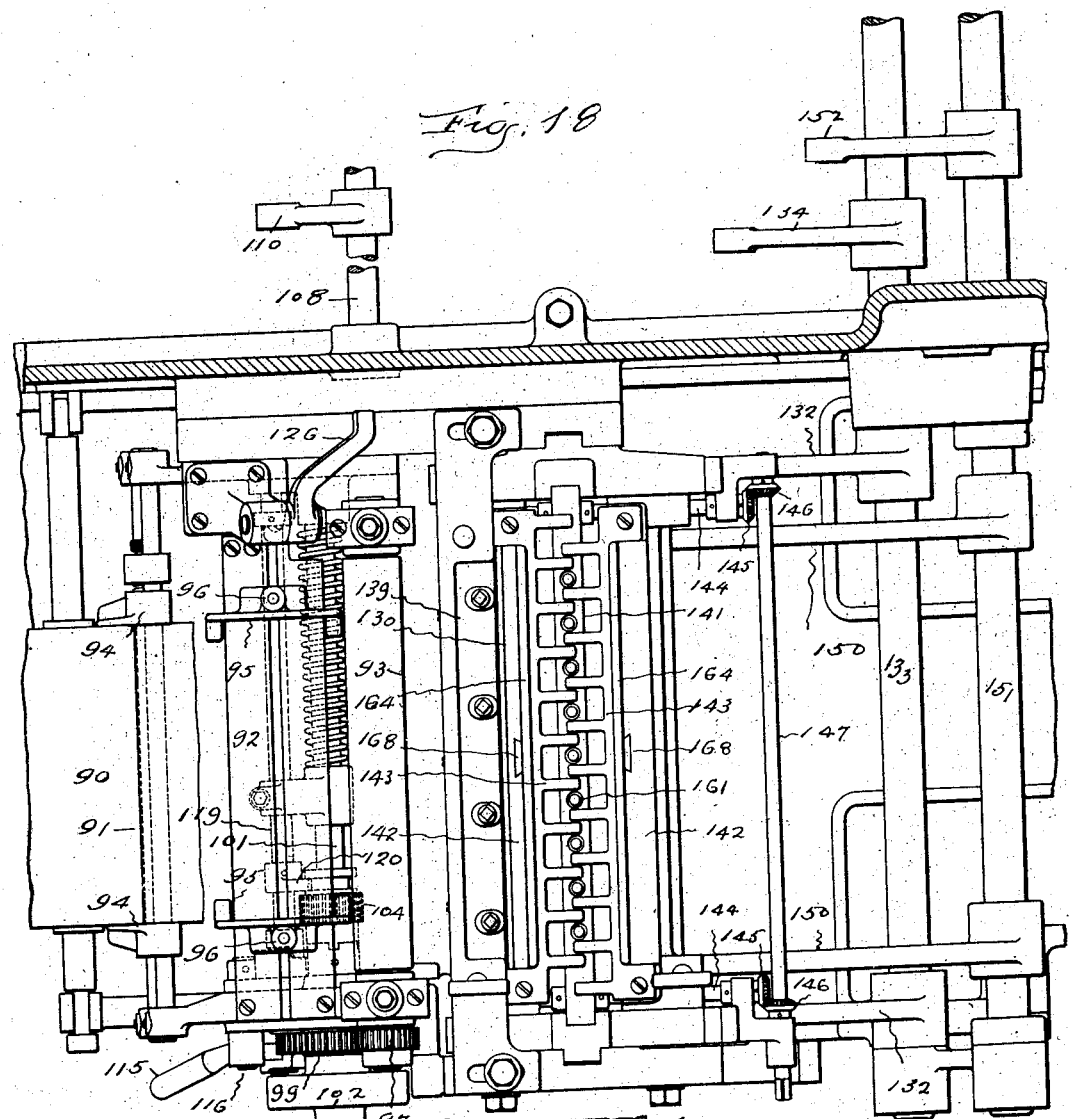
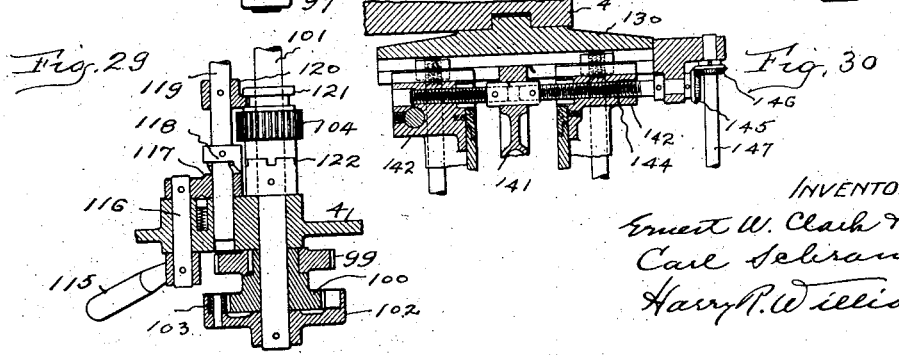

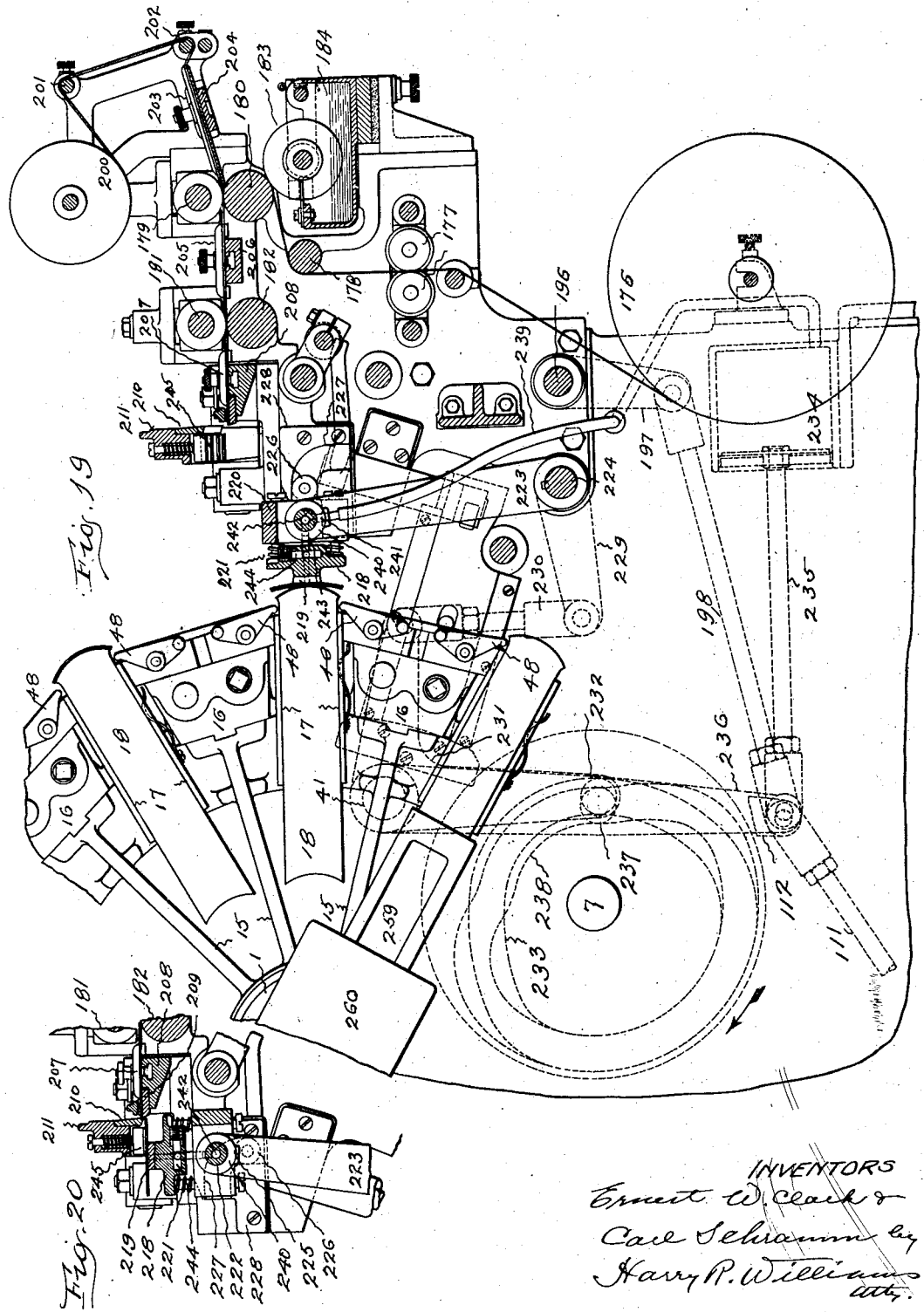

Jan. 12, 1926.

E. W. CLARK ET AL
BOOKBINDING MACHINE
Filed Dec. 9, 1924

1,569,265

13 Sheets-Sheet 10

INVENTORS
Ernest W. Clark &
Carl Schramm by
Harry R. Williams
atty.

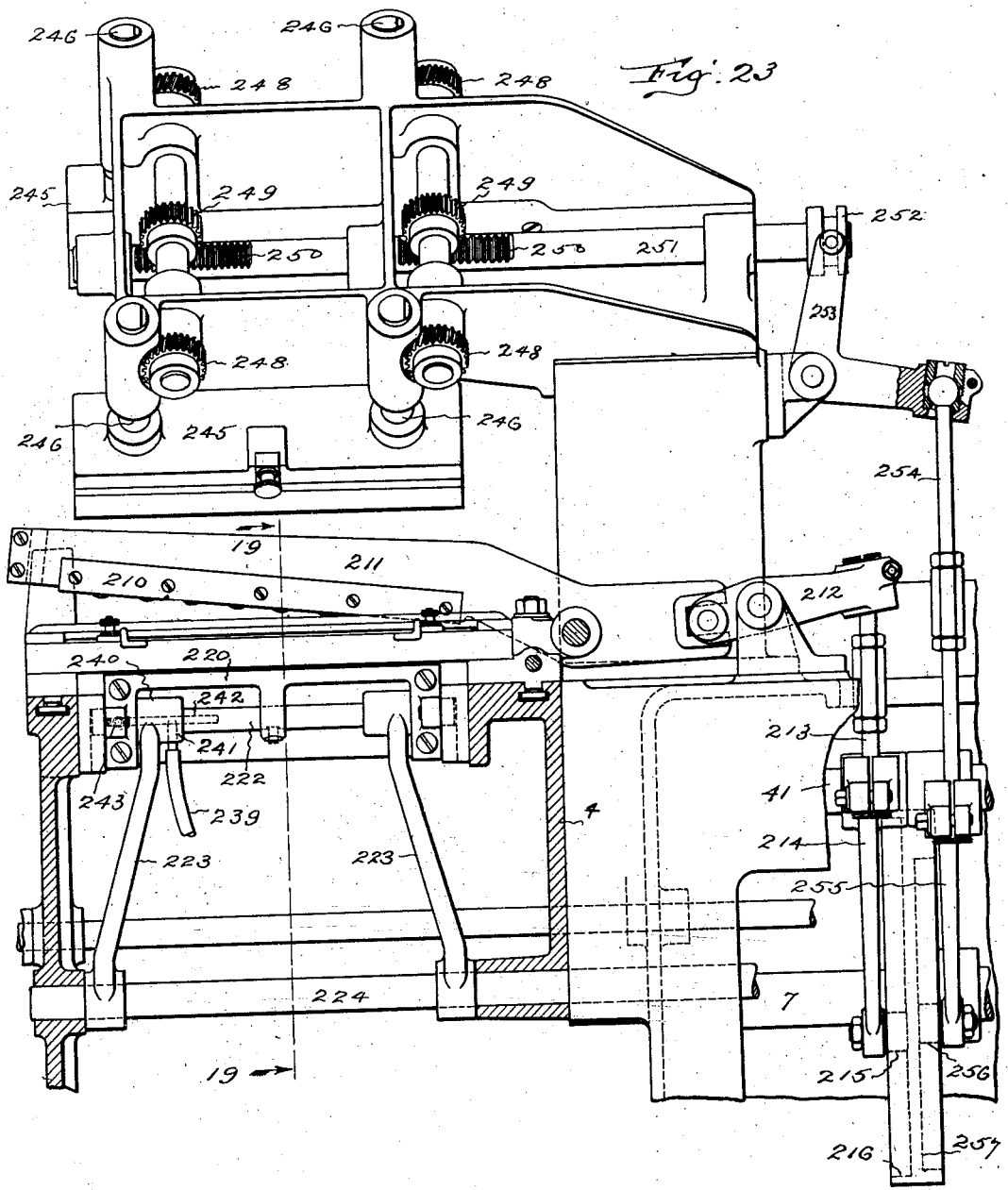

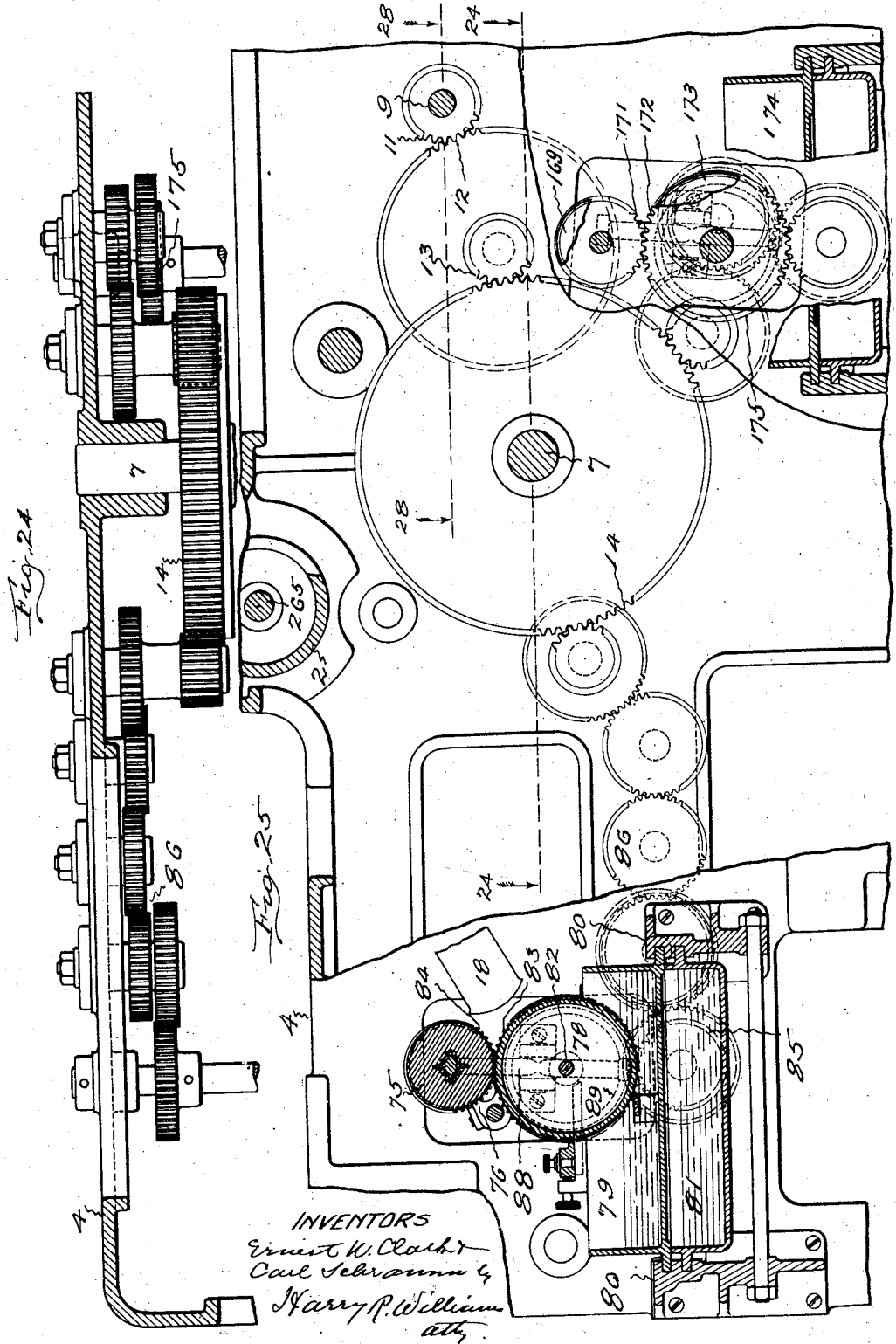

Jan. 12, 1926.　　　E. W. CLARK ET AL　　　1,569,265
BOOKBINDING MACHINE
Filed Dec. 9, 1924　　　13 Sheets-Sheet 13
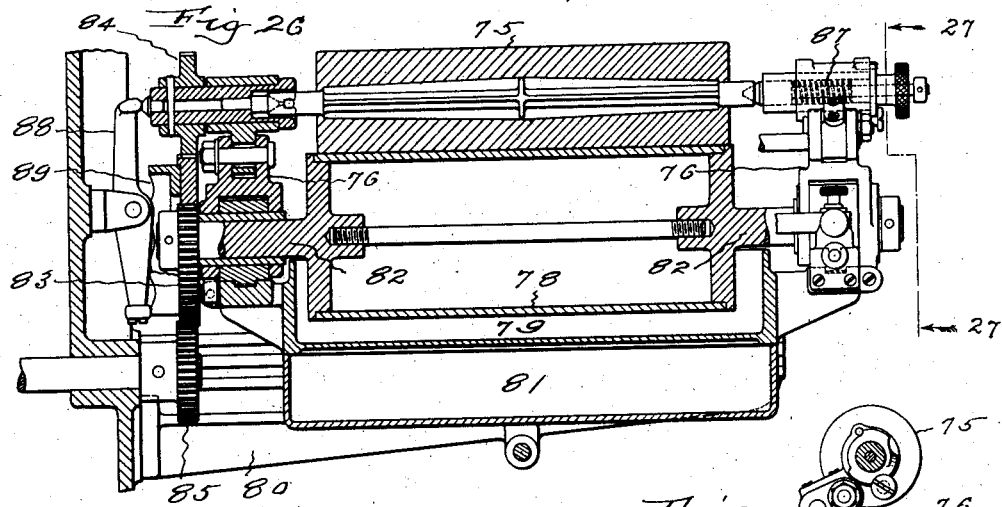
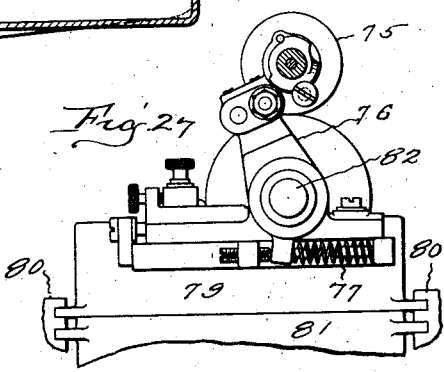
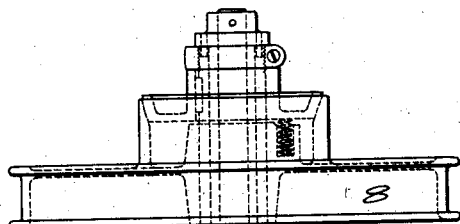
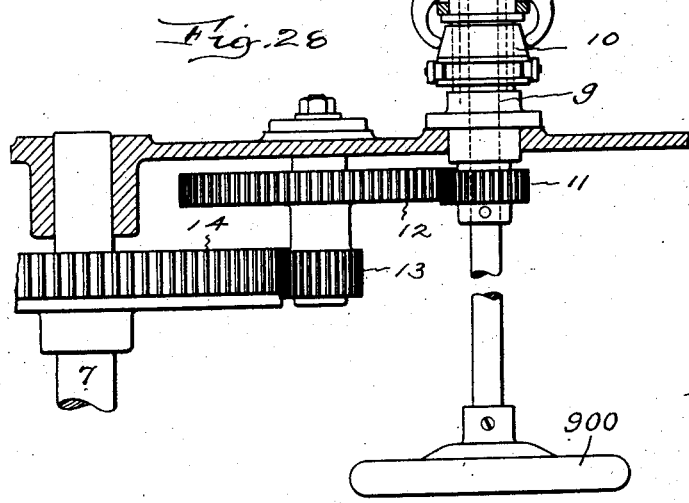
INVENTORS
Ernest W. Clark &
Carl Schramm by
Harry R. Williams
Atty.

Patented Jan. 12, 1926.

1,569,265

UNITED STATES PATENT OFFICE.

ERNEST W. CLARK, OF HARTFORD, AND CARL SCHRAMM, OF WEST HARTFORD, CONNECTICUT, ASSIGNORS TO THE SMYTH MANUFACTURING COMPANY, OF HARTFORD, CONNECTICUT, A CORPORATION OF CONNECTICUT.

BOOKBINDING MACHINE.

Application filed December 9, 1924. Serial No. 754,757.

*To all whom it may concern:*

Be it known that we, ERNEST W. CLARK and CARL SCHRAMM, citizens of the United States, residing at Hartford and West Hartford, respectively, in the county of Hartford and State of Connecticut, have invented a new and useful Improvement in Bookbinding Machines, of which the following is a specification.

In the art of binding books, after the signatures have been stitched together, it is customary to apply strips of crash or similar fabric and paper back lining strips to the backs of the books for the purpose of better holding together the stitched edges of the signatures and also providing strong means whereby the books may be secured in the cases or covers. In the better classes of books head bands are usually applied to the upper and lower ends of the back linings before the books are fastened in the cases to furnish a neat finish or trim at the top and bottom of the backs of the books inside of the backs of the cases.

The object of this invention is to provide a machine which will apply the fabric strips, back linings and head bands to the backs of the stitched books, the books being fed automatically into the machine and carried successively from position to position in which the fabric strips, back linings and head bands are shaped and applied in the required manner and the books are discharged.

In the machine illustrated at the first station, on the left, the books are one following the other fed into a rotarily mounted intermittently indexed carrier having jaws or clamps which are opened to receive the books and closed to hold them while they are being transported from station to station and then opened to permit the books to be discharged. A book while being carried from the first station to the second station passes means which applies a suitable quantity of glue to its back. At the second station there is a dwell of sufficient duration to allow the glue to partially set. At the third station there is also a dwell to allow the glue to thicken. At the fourth station the back of the book with its coating of adhesive stops opposite mechanism which applies the strip of crash, the crash, while the book is being brought around, having been fed from a roll, cut off to the correct size and carried into position to be applied to and folded around the glued section of the back of the book with its edges extending on each side to provide means for fastening the book in its case. At the fifth station nothing is done, the book stopping to allow the crash to become firmly adhered to the back. Between the fifth and sixth stations the book passes mechanism which coats a section the length of the back, over the crash, with glue. At the sixth station the glue is allowed to permeate the crash and stiffen. At the seventh station the book stops opposite mechanism which applies the paper back lining and head bands to the glued section of the back of the crash. This mechanism, while the book is being brought around, draws the paper back lining from a roll, also draws the head bands from a roll, applies glue to the edges of the back lining, and feeds the two together to a knife which cuts them off to the correct size. After being cut the back lining with the attached head bands is carried to and pressed against the book, the head bands being between the crash on the book and the paper back lining. At the eighth and ninth stations mechanism presses the back lining and head bands against the crash covered back of the book so as to ensure firm adherence. At the tenth and eleventh stations nothing is done, the adhesive being allowed to dry. At the twelfth station the carrier jaws are opened and the book is pushed out and discharged from the machine. The carrier of the machine shown has twelve pairs of holding clamps and at each stop a book is fed into the machine, the subsequent books being subject to the actions of the various mechanisms as they reach the several stations during the cycle of the machine. Mechanism is arranged to interrupt the feed of crash, paper lining and head bands to any carrier clamp that should be empty as a result of the failure of a book to be fed to the carrier. The several mechanisms are adjustable to accommodate books of different length, width and thickness, for of course the length and width of the crash and paper linings and length and position of the head bands depends upon the length and thickness of the books.

Figure 22:
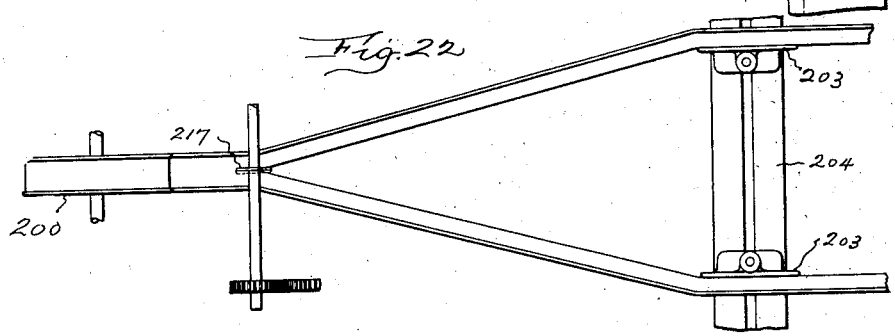
Figure 31:
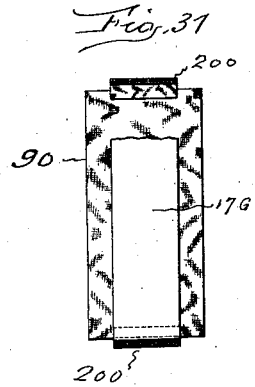

In the accompanying drawings Fig. 1 shows a front elevation of a machine which embodies the invention. Fig. 2 on larger scale shows a front elevation of the book feed mechanism, and also portions of the book clamping mechanism and book discharge mechanism. Fig. 3 shows an end view of the book feeding arm and connections. Fig. 4 shows the gears for clamping and releasing a book clamp, in closed position. Fig. 5 is a similar view showng these gears in open position. Fig. 6 is a vertical section through a portion of the carrier and book clamps, the section of the clamps being taken on dotted line 6—6 on Fig. 8. Fig. 7 shows a front elevation with parts broken away of a portion of the clamping mechanism and part of the crash feed stop. Fig. 8 shows a plan of a set of book clamps and their operating mechanisms. Fig. 9 shows a plan of one of the clamps of a set. Fig. 10 shows an edge view of one of the crash clamps. Fig. 11 shows a section on the plane indicated by the dotted line 11—11 on Fig. 9. Fig. 12 shows a front view of a portion of the carrier with a book in the position for receiving a strip of crash, and the mechanism for folding the crash around the back of the book. Fig. 13 shows a vertical section through the carrier and a side view with parts broken away of the means for pressing the crash against the back of the book. Fig. 14 is a side view of a portion of the mechanism shown in Fig. 13. Fig. 15 is a vertical section through a portion of the frame showing the cams and connections for operating the various mechanisms. Fig. 16 shows a section of the mechanism for feeding the crash and applying a severed strip to the back of the book and for folding the edges of the crash around the back, with the elements in the relations in which the crash is applied to the book. Fig. 17 is a similar section of the parts which sever a piece of crash and apply it to the book, in their lowered relation, or position in which they receive the crash from the feed rolls and before it is cut off. Fig. 18 shows a plan of the mechanism for feeding, cutting and applying the crash to the back of the book. Fig. 19 shows an elevation of a portion of the carrier and a vertical section on plane indicated by dotted line 19—19 on Fig. 23 through the mechanism which feeds, cuts and applies the paper back linings and head bands to the backs of the books, the parts in this view showing the relations when the paper lining and head bands are being pressed against the book. Fig. 20 is a section showing the knives for cutting off a strip of back lining paper with the head bands applied, this view showing the elements in the positions occupied when receiving the back linings and head bands. Fig. 21 is an end elevation looking at the mechanism for applying head bands and back linings to the backs of the books. Fig. 22 is a plan showing a portion of a head band feed mechanism. Fig. 23 shows an end elevation of the mechanism for cutting off the paper back linings and head bands, and also a portion of the presses and the operating mechanism for causing them to give the final pressure to the back linings and head bands on the back of the books. Fig. 24 is a section on dotted line 24—24 on Fig. 25 showing a plan of the gearing for driving the glue rolls. Fig. 25 is an elevation showing one of the gluing mechanisms, with a portion of the glue tank and the rolls operating in connection therewith shown in transverse vertical section. Fig. 26 is a longitudinal section through one of the gluing mechanisms. Fig. 27 shows an end view of one of the gluing mechanisms looking from the dotted line 27—27 on Fig. 26. Fig. 28 shows a portion of the main driving mechanism, the section being taken on plane indicated by dotted line 28—28 on Fig. 25. Fig. 29 is a section of parts shown in Fig. 18 illustrating the connections for driving the crash feed rolls. Fig. 30 is a section of parts shown in Fig. 18 illustrating the means for adjusting the width of the table, folders and crash cutting knives. Fig. 31 shows a book backing produced by this machine.

The book carrier 1 is rotatably mounted on a tubular shaft 2 that is supported by and held against rotation in suitable bearings 3 in the frame 4. Figs. 13, 15. The carrier is intermittently indexed from station to station so as to present the backs of the books to the various mechanisms which apply the glue, crash, paper backs and head bands, by a Geneva movement that comprises the slotted wheel 5 fastened to the back of the carrier and the crank arm 6 which is fixed to the cam shaft 7. Figs. 2, 13, 15. The rotation of the cam shaft causes the crank to engage in the slots of the wheel and turn the carrier one step for each cycle of the cams on the cam shaft.

The driving mechanism may consist of a pulley 8 adapted to be connected with the driving shaft 9 by clutch 10, the driving shaft having a pinion 11 engaging with a gear 12 on an arbor having a pinion 13 engaging a gear 14 on the cam shaft 7, as illustrated by Fig. 28. The driving shaft may be turned for setting or adjusting the parts by means of the hand wheel 900. Fig. 28.

The carrier illustrated has twelve radial webs 15, Figs. 1, 6, and fastened on the outer end of each web is a clamp frame 16 that extends longitudinally with relation to the axis of the carrier. Mounted to slide transversely on each clamp frame is a pair of clamp plates 17 that have sufficient area to properly clasp a book 18. The frames and clamp plates are so mounted about the periphery of the carrier that the width of the radial spaces between the plates on the adjacent frames may be increased and diminished, that is, the opposing plates of the adjacent frames may be opened from and closed toward each other at the proper times for receiving, clamping and releasing the books to be backed.

Extending longitudinally of each clamp frame is a pair of shafts 19. On each of these shafts is a pair of pinions 20. These pinions do not mesh with each other, but those on one shaft engage with racks 21 on the under side of arms 22 that extend inward from the back of one clamp plate, and those on the other shaft engage with racks 23 on the under side of arms 24 that extend inward from the back of the other clamp plate. Figs. 6, 8, 9, 11. On the rear ends of the shafts are toothed segments 25. The segments on the shafts on the same frame do not mesh with each other, but the design is such that the segments on the adjacent frames engage with each other so that the co-operating sets of clamp plates which face each other and are on adjacent frames will open and close coincidently. Figs. 2, 4, 5, 6, 7. Spiral springs 26, Figs. 8, 9, are coiled about the shafts and tensioned so as to cause the pinions and racks to move the plates outwardly and thus close the facing sets of clamp plates toward each other.

On one of the shafts of each frame is a rocker arm 27 bearing a roll 28. Fig. 8. The rocker arm is loosely mounted on the shaft and is adjustably connected with the segment by screws 29, 290 Figs. 7, 8, so that the relation of the roll to the segment may be altered. These rolls are engaged by an oscillatory cam 30 for causing them to rock the shafts and open the clamp plates. The cam 30 which accomplishes the opening of the clamp plates is carried by arms 31 that project from a hub 32 which is loosely supported concentric with the carrier shaft. Fig. 2. This hub is mounted on a bushing 33 fastened to the fixed shaft 2. Fig. 13. The clamp opening cam 30 is at the proper times given a short oscillatory movement so as to cause the partial opening of one set of book clamp plates and complete opening of another set of clamp plates, and also permit the closing of the clamp plates, while the carrier is at rest. This oscillation of the opening cam is accomplished by means of a rocker arm 34 which has a fork 35 that engages a block 36 pivoted to the side of the opening cam. Fig. 2. The rocker arm is fastened to a shaft 37 that has an arm 38 which is connected by a link 39 with a lever 40. Fig. 2. This lever is pivotally hung on the lever shaft 41 supported by the frame, and it has a roll 42 engaging with the cam 43 on the cam shaft 7. Fig. 15. This cam is timed so that through the lever, link and rocker arms the oscillatory opening cam 30 will be moved to engage the rolls 28 on the rocker arms 27 connected with the clamp frame shafts, at the correct intervals to open the clamp plates.

As a clamp holding a book reaches the discharge station the roll 28 of this clamp rides up on the surface 44, Figs. 2, 5, of the opening cam 30 and this through the segments turns the clamp shafts against the tension of the springs in such a manner as to cause the pinions and racks to draw the clamp plates from each other and loosen their clasp on a book and permit it to be discharged. This is accomplished with each set of clamp plates as they reach the position where a book is to be discharged. At this time the roll 28 of the clamp plates in advance, that is, the one opposite the feed mechanism, rides up on the surface 45 of the opening cam 30, Fig. 2, and the elements of this clamp are so actuated as to completely open these clamp plates and allow a book to be entered between them. This occurs in each case just before a book is to be fed into the carrier between a set of clamp plates. When a roll 28 rides off from the surface 45 down the surface 46 of the opening cam 30, Fig. 4, the springs are permitted to rotate the clamp shafts and cause the plates to close. This takes place in each case after a book has been fed between a pair of clamp plates so as to firmly clasp a book. The clamp plates are not again opened until they reach the discharge locality.

Each clamp plate supports a shaft 47 to which is fixed a yoke shaped crash holding down bar or clamp 48. Fig. 10. A spring 49 is coiled on each shaft 47 and tensioned to cause the crash clamp to turn inward or toward the sides of the book between the book clamp plates. There are a pair of the crash clamps for each book clamp, and they are carried by and moved in and out with the book clamp plates. Figs. 1, 2, 8. At each end of each crash clamp is a stud 50. When a book clamp traveling with the carrier reaches the locality of discharge the studs are engaged by a fixed cam 51. Fig. 2. This cam causes the crash clamp plates to be opened so as to relieve their pressure against the book about to be discharged. These crash clamps are again opened at the station when the crash is applied as hereinafter described.

As one series of books to be handled by the machine may be of different thickness from another, the plates of the book clamp must be initially set more or less toward or from each other so that they will properly clasp the books to be backed. This is accomplished by adjusting the rocker arms 27 bearing the rolls 28 that are engaged by the opening cam 30, with relation to the toothed segments 25. The screws 29 are loosened, the book clamp plates set in the proper relation and then the screws 290 Fig. 7, are turned so that the rocker arms will be in such position that the rolls 28 will be correctly engaged by the opening cam 30, to partially open the clamp plates when a book is to be discharged and fully open the clamp plates when a book is to be fed in. After this adjustment has been made the screws 29 are tightened.

The books to be backed are fed horizontally to a pair of opened book clamp plates at the first station, which in the machine illustrated is at the left of the carrier. A book is placed upon a table 52 adjustably supported by a bracket 53, fastened to the main machine frame. Figs. 1, 3. An upright plate 54, Fig. 3, is fastened to the table so as to engage the bottom edge of the book for locating it and forming a guiding path to the carrier. The guide is adjustably fastened by thumb screws 55 so that it may be moved in and out and set to accommodate books of different lengths.

The book is pushed into the carrier by a pad 56 that engages its back. This pad is adjustably fastened by thumb screws 57 to an arm 58 so that it may be raised or lowered from or toward the table to conform to books of different thickness. The pusher arm extends from a block 59 which is arranged to slide upon the upper edge of a way 60 on the top of the bracket 53. Fig. 3. This slide block is connected with a sprocket chain 61 that passes around a driving sprocket 62 and an idler sprocket 63. Fig. 2. On the shaft 64 of the driving sprocket is a pinion 65 that is engaged by a vertically movable rack 66. This rack is connected by a link 67 with a rocker arm 68 on a shaft 69 that has a rocker arm 70 which is connected by a link 71 with a lever 72. Fig. 2. This lever is hung upon the lever shaft 41 and it has a roll 73 engaged with the feed cam 74 on the cam shaft 7. Figs. 2, 15. The feed cam through the lever, links and rocker arms reciprocates the rack 66 and oscillates the pinion 65 so as to reciprocate the chain at the proper time to cause the arm and push pad to push a book into the opened clamp plates of the carrier at the feed station.

After the book has been fed to the carrier and the clamp plates closed so as to clasp the book, the carrier is rotated one step by the Geneva mechanism as previously described. As the book travels with the carrier from the first to the second station it passes a roll 75, Fig. 1, which applies glue to its back. This glue applying roll is mounted on swinging arms 76 which are yieldingly held by springs 77, Fig. 27, so that the periphery of the roll will normally extend into the path of the back of the book, and will roll around the back as the book passes. The arms which support the glue applying roll are loosely mounted on the axle 82 of the roll 78, Figs. 25, 26, 27, which extends down into the glue receptacle 79 and by its rotation coats the applying roll with glue. The glue receptacle is removably supported by brackets 80 mounted on the frame. Beneath the glue receptacle is a warming pan 81, also removably mounted on the brackets. Figs. 25, 26. On the axle of the glue coating roll 78 is a gear 83 that meshes with a gear 84 on the glue applying roll. Figs. 25, 26. The gear 83 is engaged by a gear 85 that is driven by a train of gears 86 from the gear 14 on the cam shaft 7. Figs. 24, 25. By this gearing the glue rolls are rotated at the desired speed. The applying roll 75 has a slight reciprocating movement longitudinally in its bearings. A spring 87 is arranged to push it in one direction, and a lever 88 oscillated by a cylindrical wave edged cam 89, attached to the gear 83 on the axle of the coating roll 78, pushes the roll 75 against the spring. Fig. 26.

After dwelling at the second station the carrier takes the book to the third station, and after a dwell at the third station the book is carried to the fourth station. After the back of the book has been glued between the first and second stations nothing more is done to it until it reaches the fourth station at which point the fabric, which is usually crash, is applied.

The crash which is as wide as the length of the book to which it is to be applied is drawn from a supply roll 90, Figs. 1, 12, 16, up and around rods 91 supported by the frame and over a bed plate 92 by a pair of feed rolls 93, Fig. 16, between which the strip passes. The rods 91 are provided with guiding collars 94 adjustable along the rods, and the bed plate has guiding flanges 95 adjustably secured by thumb screws 96, Figs. 16, 18 for ensuring the correct travel of the fabric. On the front of the machine the shafts 97 of the feed rolls have intermeshing gears 98 the lower of which is engaged by a gear 99, Fig. 12. The gear 99 is attached to a ratchet wheel 100 and both the gear and ratchet wheel are loose on the shaft 101. Fig. 29. Attached to this shaft is a housing 102 carrying pawls 103 that engage the ratchet wheel. Clutched to the shaft 101 is a pinion 104 that is engaged by a toothed segment 105, the shaft of which has a rocker arm 106. Fig. 12. A link 107 connected with the rocker arm 106 is adjustably connected with a rocker arm 108 on a shaft 109. The shaft 109 has a rocker arm 110 that is connected by a link 111 with a lever 112 which is hung on the lever shaft 41. Fig. 12. This lever has a roll 113 engaged with a cam 114 on the cam shaft 7, Figs. 12, 15. This cam through the lever, links, rocker arms, and toothed segment oscillates the pinion and housing which through the pawls and gears causes the feed rolls to intermittently feed the crash at the proper times. By changing the point of connection of the link 107 with the rocker arm 108 the distance of oscillation of the segment and pinion may be varied and the length of feed of the crash altered, for with a thin book as much crash is not fed as is necessary for a thick book.

By turning the handle 115, Figs. 12, 29, the crash feed rolls may be disconnected from their driving means. This handle is fastened to an arbor 116 that has a wedge cam 117 adapted to engage a wedge cam 118 on the longitudinally movable shaft 119. This shaft has an arm 120 engaging a grooved sleeve 121 attached to the pinion 104. Fig. 29. When the handle is turned the pinion 104 is moved along the shaft 101 so that the clutch members 122, Fig. 29, become disengaged and the feeding of crash is stopped.

The crash feed is also stopped automatically should a book fail to be fed to a set of clamp plates. If it happens that no book is fed the clamp plates close toward each other and the segments 25 are rotated by the springs 26, Fig. 8, so that the rocker arm 27 carries the roll 28 into the path of the wedge 123 which is attached to one end of a slide 124. Fig. 7. On the other end of this slide is a block 125 that, when the slide is lifted by the roll, engages the rocker arm 126 which is attached to the rocker arm 128, that engages a collar 129 on the longitudinally movable shaft 119. Figs. 7, 18. This engagement is such that when a set of clamp plates has no book the shaft 119 is moved longitudinally so as to disconnect the pinion 104 from the shaft 101 and stop the rotation of the crash feed rolls.

A length of the strip of crash from the supply roll is fed by the feed rolls upon a table 130 which is movable up and down in ways in the sides of the frame, Fig. 13, this table being in its lowest position or below the opening between the feed rolls when the crash is fed over it, Fig. 17.

Links 131 connect the bottom of this table with rocker arms 132 on a shaft 133 which has a rocker arm 134 at the back of the machine. Figs. 12, 18. The rocker arm 134 is connected by a link 135 with a bell crank lever 136 which is hung upon the lever shaft 41 and that has a roll 137 engaged with a cam 138 on the cam shaft 7, Figs. 12, 15. This cam through the lever, links, and rocker arms causes the table to be lowered to a point to receive the crash, illustrated in Fig. 17, and raised to carry the crash to the back of the book above, as illustrated in Fig. 16.

Fastened across the frame above the path of the crash between the feed rolls and the table is a knife blade 139. Fig. 18. A knife blade 140 is fastened to the table. Figs. 16, 17. When the table is raised the blades co-operate to cut off from the end of the supply of crash that lies upon the table a strip which is as wide as is required by the thickness of the book to which the strip is to be applied. The severed strip is as long as the length of the book and is somewhat wider than the thickness of the book in order that portions may extend around and beyond the back in position to be folded down against the sides of the book and provide the necessary flaps for securing the book in the case or cover when the book is bound.

The vertically movable table has at the top a fixed bar 141 at the middle, and two bars 142 each side of the middle the latter being movable toward and from each other. Attached to the top of the bars 142 are combs 143 which have interleaved teeth and that form the upper surface of the table upon which the crash is fed, Fig. 18. The bars 142 with the combs are moved toward or from each other for adjusting the width of the upper surface of the table, according to the thickness of the book and width of the crash strip cut therefor. For this purpose rods 144 are right and left threaded into the bars 142, Fig. 30, which rods have bevel gears 145 engaged by bevel gears 146 on a shaft 147 that is designed to be turned by a crank applied to its front end, Fig. 18.

Supported by the table and movable independently up and down below the fixed bar 141 is a carriage 148. Figs. 13, 16, 17. This carriage is connected by links 149 with rocker arms 150 on a shaft 151 which shaft has a rocker arm 152, Fig. 12. The arm 152 is connected by a link 153 with a bell crank lever 154 hung on the lever shaft 41 and having a roll 155 engaging with the cam 156 on the cam shaft 7. Figs. 12, 15. By this mechanism the carriage is moved up and down at the required times independently of the table.

Springs 157 and 158 are connected with rocker arms 159 and 160 fastened to the shafts 133 and 151, in such manner as to tend to lift the table and carriage and keep the cam rolls against the cams.

Extending vertically through perforations in the fixed center bar 141 of the table are pins 161, Figs. 13, 18. These pins are normally pressed upward by springs 162. The lower ends of the pins extend down through the carriage 148 and have enlarged heads 163. Figs. 13, 16, 17. When the table and carriage are in their lowest relative positions the under side of the carriage engages the heads at the lower ends of the pins and draws the pins downward against the thrust of the springs, so that their upper ends are below the top surface of the table upon which the crash is fed, as shown in Fig. 17. As the table and carriage rise with the cut strip of crash and approach the back of the book the carriage moves a little ahead of the table and this permits the springs 162 to thrust up the pins and cause them to impinge against the crash and press it against the glued back of the book at intervals along the center for the entire length of the book. This causes an initial adherence of the crash to the back of the book.

Supported by the carriage and movable upward with it are folding wings 164. These wings are spaced apart a little wider than the thickness of the book and are cushioned by springs 165, Figs. 13, 16. After the carriage has stopped its upward movement the table continues and these wings engage the free edges of the strip of crash and carry them up and wrap them around the back toward the sides of the book as shown in Figs. 12, 16. The folding wings are connected by dove-tails 168 to the faces of the horizontally movable bars 142 carried by the table so that while the wings are free to move up and down with the carriage they are adjustable toward and from each other with the bars and table comb. Figs. 17, 18.

Attached to the table on either side are posts 166. As the table rises these posts engage with the studs 50 that project from the ends of the crash clamps 48 so as to open these clamps and allow the folders to pass upward beyond them. Fig. 12. Springs 167, Fig. 14, cushion these posts. When the table moves down the crash lamps are free to close, as previously described, so as to hold the free edges of the crash against the sides of the book, until they are again opened at the book discharge station.

After the crash has been pressed against the back of the book by the pins and folded around the edges of the back of the book by the folders, the table and carriage, carrying the knife, pins, folders and posts, are lowered to a position where they receive the next strip of crash as it is fed by the feed rolls. When the folders move down the crash clamps swing in and hold the loose flaps against the sides of the book as described. The carrier is then indexed to the next, or fifth station.

Nothing is done to the book when stopped at the fifth station, the adhesive being allowed at this time to set so as to closely bind the crash to the back of the book. On being carried between the fifth and sixth stations the back of each book, with the crash securely attached, is given a coating of glue by a roll 169, Fig. 1. This glue applying roll is mounted on a yielding arm 170 in the same manner as the glue applying roll 75, shown in Figs. 1, 25, 26, 27, that is arranged between the first and second stations. The shaft of the glue applying roll 169 has a gear 171 meshing with the gear 172 on the glue coating roll 173 that is in the glue receptacle 174. The gear 172 is driven by a train of gears 175 from the gear 14 on the cam shaft 7. Figs. 24, 25.

At the sixth station nothing is done, the adhesive last applied being allowed to thicken.

At the seventh station the paper back lining strip provided at its ends with the head bands is applied to the back of the book over the crash.

The paper from which the back linings are cut is drawn from a roll 176 between cutters 177 that trim the edges and over a roll 178 by a pair of feed rolls 179 and 180, and a pair of feed rolls 181 and 182. As the paper strip is drawn under the feed roll 180 it is coated with adhesive by disks 183 that turn in a glue receptacle 184. Figs. 19, 21. These disks coat the edges of the paper in stripes near the edges only for the adherence of the head bands. At the front of the machine these feed rolls are provided with intermeshing gears 185 and 186 the lower of which mesh with a gear 187. Fig. 1. The gear 185 of the feed roll 180 meshes with a gear 188 on the shaft of the gluing disks 183, Figs. 1, 21. The gear 186 of the feed roll 182 is driven by a gear 189 loose on a shaft 190. Fig. 1. The mechanism for driving this gear 189 and these paper and head band feed rolls is the same as that described for driving the crash feed rolls 93 and which is illustrated in Figs. 12 and 29, and being a duplicate of the crash feed and driven from the same cam, is not shown in detail but merely indicated on Fig. 1. The pinion 191 is fastened to the shaft 190 which through pawls and a ratchet wheel, as previously described, is connected with the gear 189. The pinion is engaged by a segment 192 connected with a rocker arm 193 that is by a link 194 adjustably connected with the crank 195. Fig. 1. The crank shaft 196 has a rocker arm 197 connected by a link 198 with the lever 112 Fig. 19 that has a roll 113 engaging the cam 114, Figs. 12, 15, which cam and lever, as shown in Fig. 12, operates the crash feed roll. By these mechanisms the strip of crash and the strip of paper and head bands are fed coincidently.

As stated the back lining paper is coated by the disks 183 with stripes of adhesive as it passes under the feed roll 180. The head bands are drawn into the mechanisms and applied to the paper strip along the edges coated with adhesive, by the feed rolls 179 and 180. The head bands may be wound in separate lengths in a roll 200 and drawn over a rod 201, around a rod 202 and along guides 203 adjustably mounted on a bar 204, to the feed rolls 179 and 180 which press them firmly upon the surfaces at the edges of the strip of paper that has been coated with glue. From the feed rolls 179 and 180 the back lining with the head bands pressed on to each edge, is drawn over guides 205 adjustably attached to a bar 206, between the feed rolls 181 and 182. Fig. 19. Beyond the feed rolls 181 and 182 the paper and bands pass between guides 207 adjustably attached to a bracket 208. Fastened on this bracket is a fixed knife 209. Adapted to co-operate with this knife for severing a strip from the supply of back lining paper with the head bands attached, is a movable blade 210. This latter blade is shown in raised position in Fig. 19 and in lowered position in Fig. 20. The movable blade is fastened to a lever 211 the rear end of which is engaged by a lever 212. Fig. 23. This lever is connected by a link 213 with a bell crank lever 214 mounted on the lever shaft 41 and that has a roll 215 engaged by the cam 216. Figs. 15, 23. By this means the movable knife blade is oscillated at the proper times to shear off a strip of back lining paper with the attached head bands. The head bands may, if desired, as shown in Fig. 22, be woven in one piece, which as it is drawn into the mechanisms by the feed rolls may be severed by a slitter 217. It is immaterial whether the head bands be supplied already separated and taken from two rolls or supplied woven in one piece and severed by a slitter as indicated.

The cut off strip of the paper with the applied head bands is fed onto a bed 218 which is chambered and has a resilient pad 219 on its face with perforations that communicate with the chamber in the bed. The bed is mounted on a yoke shaped frame 220 with interposed cushioning springs 221. Figs. 19, 20. The frame 220 is mounted on a shaft 222 that is carried by arms 223 attached to a shaft 224. Figs. 19, 23. Projecting from the back of the block are ears 225 with rolls 226. These rolls fit and run in curved grooves 227 in plates 228 fastened to the frame. Figs. 19, 23. The rocking of the shaft 224 and the arms 223 carries the frame and bed back and forth. When carried back the rolls 226 travel around and down the guide groove 227 and turn the bed and pad into a horizontal position. This position is shown in Fig. 20. When the shaft 224 and rocker arms 223 turn forward the rolls 226 travel up and around in the guiding grooves and this turns the bed into vertical position, which position is shown in Fig. 19. With the bed horizontal it is in position to receive the end of the back lining paper provided with the head bands. The movable knife blade is brought down when the bed is horizontal so as to sever a strip of the desired width to cover the back of the particular book to which it is to be applied. The shaft 224 which carries the bed has a rocker arm 229 that is connected by a link 230 with a bell crank lever 231 on the lever shaft 41. This lever has a cam roll 232 which engages a cam 233 on the cam shaft 7.

Fig. 19. This cam through the lever, link and rocker arms carries the bed back and forth so that it is alternately turned from a horizontal position where it receives the paper and head bands, to a vertical position where it presses the severed strips of paper and head bands against the back of the book which has a coating of glue to effect the adherence of the paper to the book.

For holding the paper to the pad on the bed while it is being transferred from horizontal to vertical position a suction pump 234, Fig. 19, is provided. The piston rod 235 of this pump is connected with a lever 236 hung on the lever shaft 41 and provided with a roll 237 that engages a cam 238 on the cam shaft 7. Figs. 19, 25. The pump is connected by a suitable flexible conduit 239 with the hub 240 of one of the rocker arms 223. Figs. 19, 23. An opening 241, Fig. 23, is made through this hub to an opening 242 in the shaft 222 and from this shaft opening is a passage 243 to the chamber 244 in the bed, Fig. 19. When the pump piston moves in one direction, that is, when the bed is horizontal, it produces a partial vacuum in the bed sufficient to hold the paper back lining with the head bands to the pad while it is being transferred from the horizontal to the vertical position. Pads 245 are yieldingly mounted on the lever 211 that carries the movable shear blade 210 Figs. 19, 23, so as to hold the paper down to the pad when the pump is creating the suction. Fig. 20. When the pad is in the vertical position the pump piston is reversed so as to release the suction back of the paper and permit it to be pressed against the glued surface of the back of the book. After this has been accomplished the carrier is indexed and the book carried to the eighth station.

At the eighth and ninth stations the back lining is pressed by soft pads 245, desirably made of rubber, against the back of the book. Fig. 1. These pads are carried by posts 246 mounted to move radially of the book carrier in a bracket 247 attached to the top of the frame. The posts have racks engaged by pinions 248. On the shafts of these pinions, at the center of the frame, are pinions 249 that are engaged by racks 250 on a slidable bar 251. Fig. 23. The end of this bar has a grooved collar 252 that is engaged by the end of a bell crank lever 253. This bell crank lever is connected by a link 254 with a bell crank lever 255 mounted on the lever shaft 41 and having a roll 256 engaging with the cam 257 on the cam shaft 7. Figs. 15, 23. This cam is timed to through the levers, racks and pinions, force the pressing pads radially inward at the proper intervals to press the back linings firmly against the backs of the books and hold them while the adhesive is setting.

At the tenth and eleventh stations nothing is done. The adhesive is given time at these localities to harden and become firmly set.

At the twelfth station the book with the back lining applied is discharged. The clamp plates which hold the book are opened as previously described so as to relieve their clasp and the book is pushed out onto any suitable means for receiving it which may be a table 258 shown in Fig. 1. The book is pushed radially outward by the discharge pusher 259 that is supported in a box 260 at the center of the front of the machine. Fig. 1. This box is desirably fastened to the front end of the stationary shaft 2 which supports the carrier. Fig. 13. Attached to the pusher is a rack 261. Figs. 2, 13. This rack is engaged by a gear 262 connected with a pinion 263 engaged by a gear 264 on a shaft 265 that extends axially through the stationary shaft 2. Figs. 2, 13, 15. At the rear of the machine this shaft 265 has a gear 266 engaged with which is a segment 267 on a shaft 268 provided with a gear 269 that is engaged by a toothed segment 270 on the end of a bell crank lever 271. This lever is hung on the lever shaft 41 and has a roll 272 engaging the cam 273 on the cam shaft 7. Figs. 2, 15.

The travel of one book has been described. Of course, it is obvious that a book is fed in at each stop of the carrier so that in the machine illustrated there will be twelve books subjected to the action of the mechanisms, which after feeding in and clamping the books, coats the backs with glue and then feeds a strip of crash, cut to the proper size, and applies it to the glued backs. After this has become dried the backs are again, over the crash, coated with adhesive and back lining strips provided with head bands are fed to the backs and there pressed firmly thereon, following which the books are discharged. The mechanisms feed the head bands and the paper back linings together after coating the paper, and then cut the paper with the attached head bands to the correct size. The mechanisms as pointed out are adjustable for books of various thicknesses, lengths and widths and the feed mechanisms for the crash, and for the paper and head bands are stopped should a book fail to be fed into a set of clamps of the book carrier.

The invention claimed is:—

1. A machine for backing books, comprising an intermittently moved carrier, said carrier having means for holding books, means for applying adhesive to the backs of the books in the carrier, mechanism for applying head bands to back linings and mechanisms for applying strips of fabric, and said united back linings and head bands to the adhesive-coated backs of the books.

2. A machine for backing books comprising a rotatory carrier, said carrier having clamps for holding books, mechanism for intermittently rotating the carrier, mechanism for opening and closing the book clamps, means for applying adhesive to the backs of the books, mechanism for applying head bands to back linings and mechanisms for applying strips of fabric, and said united back linings and head bands to the adhesive-coated backs of the books.

3. A machine for backing books comprising a rotatory carrier, said carrier having clamps for holding books, mechanism for intermittently rotating the carrier, mechanism for opening and closing the book clamps, mechanism for feeding the books to the clamps, means for applying adhesive to the backs of the books, mechanism for applying head bands to back linings and mechanisms for applying strips of fabric, and said united back linings and head bands to the adhesive-coated backs of the books.

4. A machine for backing books comprising a rotatory carrier, said carrier having clamps for holding books, mechanism for intermittently rotating the carrier, mechanism for opening and closing the book clamps, mechanism for discharging the books from the clamps, means for applying adhesive to the backs of the books, mechanism for applying head bands to back linings and mechanisms for applying strips of fabric, and said united back linings and head bands to the adhesive-coated backs of the books.

5. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanism for applying head bands to back linings and mechanisms for applying strips of fabric, and said united back linings and head bands to the adhesive-coated backs of the books.

6. A machine for backing books comprising a rotatory carrier, said carrier having clamps for holding books, mechanism for intermittently rotating the carrier, mechanism for opening and closing the book clamps, means for applying adhesive to the backs of the books, mechanisms for feeding, cutting and applying strips of fabric to the adhesive-coated backs of the books and mechanism for securing head bands to back linings and applying said united head bands and back linings to the fabric on the backs of the books.

7. A machine for backing books comprising a rotatory carrier, said carrier having clamps for holding books, mechanism for intermittently rotating the carrier, means for applying adhesive to the backs of the books, and mechanisms for feeding, cutting and applying strips of back linings provided with head bands to the adhesive-coated backs of the books.

8. A machine for backing books comprising a rotatory carrier, said carrier having clamps for holding books, mechanism for intermittently rotating the carrier, means for applying adhesive to the backs of the books, mechanisms for feeding, cutting and applying strips of fabric to the backs of the books, and mechanism for uniting back linings and head bands and applying such united back linings and head bands to the adhesive-coated backs of the books.

9. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanisms for applying strips of fabric to the adhesive-coated backs of the books, means for applying adhesive to the fabric on the backs of the books, and mechanism for uniting and feeding such united back linings and head bands to the coated fabric on the backs of the books.

10. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanisms for applying strips of fabric to the adhesive-coated backs of the books, means for applying adhesive to the fabric on the backs of the books, mechanism for uniting and feeding said united back linings and head bands to the coated fabric on the backs of the books, and mechanism for pressing said united linings and bands to the backs of the books.

11. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanisms for feeding and applying strips of fabric, mechanism for securing head bands to back linings and applying such united back linings and head bands to the adhesive-coated backs of the books, and mechanism for interrupting the feed of the fabric, back linings and head bands to book clamps which contain no books.

12. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanisms for feeding and applying strips of fabric to the adhesive-coated backs of the books, and mechanism for interrupting the feed of the fabric to book clamps which contain no books.

13. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanisms for feeding and applying strips of united back lining and head bands to the adhesive-coated backs of the books, and mechanism for interrupting the feed of the back linings and head bands to the clamps which contain no books.

14. A machine for backing books comprising a carrier, said carrier having means for holding books, mechanism for intermittently feeding the carrier, means for applying adhesive to the backs of the books, mechanism for feeding head bands and back linings and uniting them, and mechanisms for applying strips of the united head bands and back linings to the adhesive-coated backs of the books.

15. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanism for feeding and uniting head bands and back linings, and mechanisms for applying strips of the united head bands and back linings to the adhesive-coated backs of the books.

16. A machine for backing books comprising a rotatory carrier, said carrier having means for holding books, mechanism for intermittently feeding the carrier, and mechanisms for uniting strips of head bands and back linings and applying such united strips to the backs of the books in the carrier.

17. A machine for backing books comprising a carrier, said carrier having means for holding books, mechanism for feeding the carrier, and mechanisms uniting strips of head bands and back linings and applying such united strips to the backs of the books in the carrier.

18. A machine for backing books comprising a carrier, said carrier having means for holding books, mechanism for feeding the carrier, means for applying adhesive to the backs of the books, and mechanisms for applying strips of back lining provided at their ends with head bands to the adhesive-coated backs of the books.

19. A machine for backing books comprising a rotatory carrier, said carrier having clamps for holding books, mechanism for intermittently rotating the carrier, mechanism on the carrier for opening and closing the book clamps, means adapted to be engaged by the clamp opening mechanism for opening the clamps, mechanism for feeding the books to the clamps, mechanism for discharging the books from the clamps, means for applying adhesive to the backs of the books, mechanisms for applying strips of fabric to the adhesive-coated backs of the books, means for applying adhesive to the fabric on the backs of the books, mechanism for feeding united back linings and head bands to the coated fabric on the backs of the books, and mechanism for pressing said linings and head bands to the backs of the books.

20. A machine for backing books comprising a rotatory carrier, said carrier having clamps for holding books, mechanism for intermittently rotating the carrier, mechanism on the carrier for opening and closing the book clamps, an oscillatory cam adapted to be engaged by the clamp opening means for opening the clamps, mechanism for feeding the books to the clamps, mechanism for discharging the books from the clamps, means for applying adhesive to the backs of the books, mechanism for applying strips of fabric to the adhesive-coated backs of the books, means for applying adhesive to the fabric on the backs of the books, mechanism for feeding united back linings and head bands to the coated fabric on the backs of the books, and mechanism for pressing said linings and head bands to the backs of the books.

21. A machine for backing books comprising a rotatory carrier, said carrier having clamps for holding books, mechanism for intermittently rotating the carrier, an oscillatory cam for opening the book clamps, springs for closing the book clamps, mechanism for feeding the books to the clamps, mechanism for discharging the books from the clamps, means for applying adhesive to the backs of the books, mechanism for applying strips of fabric to the adhesive-coated backs of the books, means for applying adhesive to the fabric on the backs of the books, mechanism for feeding united back linings and head bands to the coated fabric on the backs of the books, and mechanism for pressing said linings and head bands to the backs of the books.

22. A machine for backing books comprising a rotatory carrier, said carrier having a plurality of sets of clamp plates for holding books, mechanism for intermittently rotating the carrier, gearing connecting a clamp plate of one set with the clamp plate of the adjacent set whereby the adjacent set of plates open and close coincidently, mechanism for feeding the books to the clamps, mechanism for discharging the books from the clamps, means for applying adhesive to the backs of the books, mechanism for applying strips of fabric to the adhesive-coated backs of the books, means for applying adhesive to the fabric on the backs of the books, mechanism for feeding back linings and head bands to the coated fabric on the backs of the books, and mechanism for pressing said linings and head bands to the backs of the books.

23. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanisms for applying strips of fabric to the adhesive-coated backs of the books, means for applying adhesive to the fabric on the backs of the books, means on the carrier for clamping the edges of the fabric to the sides of the book, mechanism for feeding united back linings and head bands to the coated fabric on the backs of the books, and mechanism for pressing said linings and head bands to the backs of the books.

24. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanism for applying strips of fabric to the adhesive-coated backs of the books, folders for wrapping the edges of the fabric about the backs of the books, means for applying adhesive to the fabric on the backs of the books, mechanism for feeding united back linings and head bands to the coated fabric on the backs of the books, and mechanism for pressing said linings and head bands to the backs of the books.

25. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanism for applying strips of fabric to the adhesive-coated backs of the books, folders for wrapping the edges of the fabric about the backs of the books, means on the carrier for clamping the edges of the fabric to the sides of the books, means for applying adhesive to the fabric on the backs of the books, mechanism for feeding back linings and head bands to the coated fabric on the backs of the books, and mechanism for pressing said linings and head bands to the backs of the books.

26. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanism for applying strips of fabric to the adhesive-coated backs of the books, means for applying adhesive to the fabric on the backs of the books, mechanism for feeding a strip of back lining, means for applying adhesive to the edges of the back lining strip, mechanism for feeding head bands to the coated edges of the back lining strip, means for shearing strips from the united back lining and head band strip, and mechanism for applying said severed strips of lining and head bands to the backs of the books.

27. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanism for applying strips of fabric to the adhesive-coated backs of the books, means for applying adhesive to the fabric on the backs of the books, and mechanism for feeding back linings and head bands to the coated fabric on the backs of the books, said mechanism for feeding the fabric and the linings being co-operatively connected so as to feed the fabric and linings and bands coincidently.

28. A machine for backing books comprising a rotatory carrier, said carrier having clamps for holding books, mechanism for intermittently rotating the carrier, mechanism for opening and closing the book clamps, mechanism for intermittently feeding the books to the clamps, mechanism for discharging the books from the clamps, means for applying adhesive to the backs of the books, mechanism for feeding, cutting and applying strips of fabric to the adhesive-coated backs of the books, means for folding the edges of the fabric about the backs of the books, means for clamping the edges of the fabric to the sides of the books, means for applying adhesive to the fabric on the backs of the books, mechanism for feeding, uniting and cutting back linings and head bands, mechanism for applying the united head bands and linings to the coated fabric on the backs of the books, and mechanism for pressing said linings and head bands to the backs of the books.

29. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanism for feeding, cutting and applying strips of fabric to the adhesive-coated backs of the books, reciprocatory folders for wrapping the edges of the fabric about the backs of the books, means on the carrier for clamping the edges of the fabric to the sides of the books, means movable with said folders for opening said fabric clamping means, means for applying adhesive to the fabric on the backs of the books, mechanism for feeding back linings and head bands to the coated fabric on the backs of the books, and mechanism for pressing said linings and head bands to the backs of the books.

30. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanisms for applying strips of fabric to the adhesive-coated backs of the books, means for applying adhesive to the fabric on the backs of the books, mechanism for feeding and uniting back linings and head bands, mechanism for cutting strips of united back lining and head bands, and mechanism for transferring said strips to the coated fabric on the backs of the books.

31. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanism for applying strips of fabric to the adhesive-coated backs of the books, means for applying adhesive to the fabric on the backs of the books, mechanism for feeding and uniting back linings and head bands, an oscillatory shear for cutting strips of united back lining and head bands, and mechanism for transferring said strips to the coated fabric on the backs of the books.

32. A machine for backing books comprising a rotatory carrier, said carrier having clamps for holding books, mechanism for intermittently rotating the carrier, mechanism for opening and closing said clamps, mechanism for feeding the books to the clamps, mechanism for discharging the books from the clamps, means for applying adhesive to the backs of the books, mechanism for feeding and uniting back linings and head bands, mechanism for cutting strips of united back lining and head bands, and mechanism for transferring said strips to the coated backs of the books.

33. A machine for backing books comprising a rotatory carrier, said carrier having clamps for holding books, mechanism for intermittently rotating the carrier, mechanism for opening and closing said clamps, mechanism for feeding the books to the clamps, mechanism for discharging the books from the clamps, means for applying adhesive to the backs of the books, mechanism for feeding and uniting back linings and head bands, mechanism for cutting strips of united back lining and head bands, mechanism for transferring said strips to the coated backs of the books, and means for pneumatically holding said strips to the transfer mechanism while they are being transferred to the backs of the books.

34. A machine for backing books comprising a rotatory carrier, said carrier having clamps for holding books, mechanism for intermittently rotating the carrier, mechanism for opening and closing said clamps, mechanism for feeding the books to the clamps, mechanism for discharging the books from the clamps, means for applying adhesive to the backs of the books, mechanism for feeding and uniting back linings and head bands, mechanism for cutting strips of united back lining and head bands, mechanism for transferring said strips to the coated backs of the books, and a pump connected to produce a suction on the face of the transfer mechanism when it is transferring back linings and head bands to the backs of the books.

35. A machine for backing books comprising a rotatory carrier, said carrier having clamps for holding books, mechanism for intermittently rotating the carrier, mechanism for opening and closing the book clamps, mechanism for feeding the books to the clamps, mechanism for discharging the books from the clamps, means for applying adhesive to the backs of the books, mechanism for feeding and uniting back linings and head bands, an oscillatory shear for cutting strips of united back lining and head bands, and mechanism for transferring said strips to the backs of the books.

36. A machine for backing books comprising a carrier, mechanism for intermittently feeding the carrier, mechanism for feeding the books to the carrier, mechanism for discharging the books from the carrier, means for applying adhesive to the backs of the books, mechanism for applying strips of fabric to the adhesive-coated backs of the books, means for applying adhesive to the fabric on the backs of the books, mechanism for feeding and uniting back linings and head bands, a shear for cutting strips of united back lining and head bands, and mechanism for transferring said strips to the coated fabric on the backs of the books.

ERNEST W. CLARK.
CARL SCHRAMM.